United States Patent
Makino (10) Patent No.: US 10,185,875 B2
(45) Date of Patent: Jan. 22, 2019

(54) IMAGE PROCESSING DEVICE, IMAGE DISPLAY DEVICE, IMAGE PROCESSING METHOD, AND MEDIUM

(71) Applicant: CASIO COMPUTER CO., LTD., Shibuya-ku, Tokyo (JP)

(72) Inventor: Tetsuji Makino, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 15 days.

(21) Appl. No.: 15/026,944

(22) PCT Filed: Oct. 3, 2014

(86) PCT No.: PCT/JP2014/076583
§ 371 (c)(1),
(2) Date: Apr. 1, 2016

(87) PCT Pub. No.: WO2015/050250
PCT Pub. Date: Apr. 9, 2015

(65) Prior Publication Data
US 2016/0239702 A1    Aug. 18, 2016

(30) Foreign Application Priority Data

Oct. 4, 2013 (JP) .................................. 2013-209141
Sep. 19, 2014 (JP) .................................. 2014-190650

(51) Int. Cl.
*G06K 9/00* (2006.01)
*H04N 5/232* (2006.01)
(Continued)

(52) U.S. Cl.
CPC ....... *G06K 9/0061* (2013.01); *G06K 9/00604* (2013.01); *G06T 5/001* (2013.01);
(Continued)

(58) Field of Classification Search
CPC .. G06T 5/001; G06T 5/20; G06T 5/40; G06T 5/50; G06T 7/62; G06T 5/005;
(Continued)

(56) References Cited

U.S. PATENT DOCUMENTS 7,298,874 B2    11/2007   Cho
2002/0154794 A1    10/2002   Cho
(Continued)

FOREIGN PATENT DOCUMENTS

CN    1493055 A    4/2004
JP    2000139878 A    5/2000
(Continued)

OTHER PUBLICATIONS

An English Translation of Endo (JP02000139878A) by computer, May 23, 2000.*
(Continued)

*Primary Examiner* — Duy M Dang
(74) *Attorney, Agent, or Firm* — Holtz, Holtz & Volek PC (57) ABSTRACT

The purpose of the present invention is to make a facial expression when the eyes are moved more natural. An image processing device (100) is provided with the following: an image acquisition unit (5a) for acquiring an image that includes the eyes; an iris detection unit (5c) for detecting from the acquired image the iris region of the eyes; and an eye image generation unit (5f) for supplementing a deficient portion of the iris region so that the shape of the detected iris region becomes substantially circular.

13 Claims, 10 Drawing Sheets

(51) Int. Cl.
    *G06T 5/00*     (2006.01)
    *G06T 7/62*     (2017.01)

(52) U.S. Cl.
    CPC ................ *G06T 5/005* (2013.01); *G06T 7/62* (2017.01); *H04N 5/23219* (2013.01); *G06T 2207/10024* (2013.01); *G06T 2207/30041* (2013.01); *G06T 2207/30201* (2013.01)

(58) Field of Classification Search
    CPC .... G06K 9/40; G06K 9/0061; G06K 9/00597; G06K 9/00604; H04N 5/23219
    See application file for complete search history.

(56) References Cited

U.S. PATENT DOCUMENTS

| | | |
|---|---|---|
| 2004/0114782 A1 | 6/2004 | Cho |
| 2008/0113785 A1* | 5/2008 | Alderucci ............... G06F 21/32 463/29 |
| 2008/0159600 A1 | 7/2008 | Cho |

FOREIGN PATENT DOCUMENTS

| | | |
|---|---|---|
| JP | 2002269565 A | 9/2002 |
| JP | 2012103941 A | 5/2012 |
| JP | 2012168562 A | 9/2012 |
| JP | 2012185624 A | 9/2012 |

OTHER PUBLICATIONS

International Search Report (ISR) dated Dec. 16, 2014 issued in International Application No. PCT/JP2014/076583.
Japanese Office Action dated Nov. 17, 2015 issued in counterpart Japanese Application No. 2014-190650.
International Preliminary Report on Patentability (IPRP) including Written Opinion (and English translation thereof) dated Apr. 5, 2016, issued in International Application No. PCT/JP2014/076583.
Chinese Office Action dated Feb. 24, 2018 issued in counterpart Chinese Application No. 201480054644.7.

* cited by examiner

IMAGE PROCESSING DEVICE, IMAGE DISPLAY DEVICE, IMAGE PROCESSING METHOD, AND MEDIUM

TECHNICAL FIELD

The present invention relates to an image processing device, an image display device, an image processing method, and a medium to detect an eye in an image.

BACKGROUND ART

There has been a known technology to create a face image with an expression based on a face area of a subject in a taken image and based on control points to represent the expression (see, for example, Patent Literature 1).

PRIOR ART LITERATURES

Patent Literatures

Patent Literature 1: Japanese Unexamined Patent Application Publication No. 2012-185624

DISCLOSURE OF INVENTION

Problems to be Solved by the Invention

Part of human eyes is typically covered with eyelids. So, Patent Literature 1 may not be able to control movements of a face and movements of eyes properly, leading to an unnatural expression on the face as a whole.

The present invention has been made in view of such a problem and aims to make a representation of a face natural.

Means for Solving Problems

An aspect of the present invention is an image processing device including: an input unit which obtains an image including an eye; and a controller which detects an iris area of the eye in the image obtained by the input unit, and fills in a missing part of the detected iris area so that the iris area has a substantially circular shape.

Effects of the Invention

The present invention can make a representation of a face natural.

EMBODIMENT TO CARRY OUT THE INVENTION

A specific mode of the present invention will now be described with reference to the drawings. The scope of the invention is, however, not limited to the examples shown in the drawings.

Figure 1:
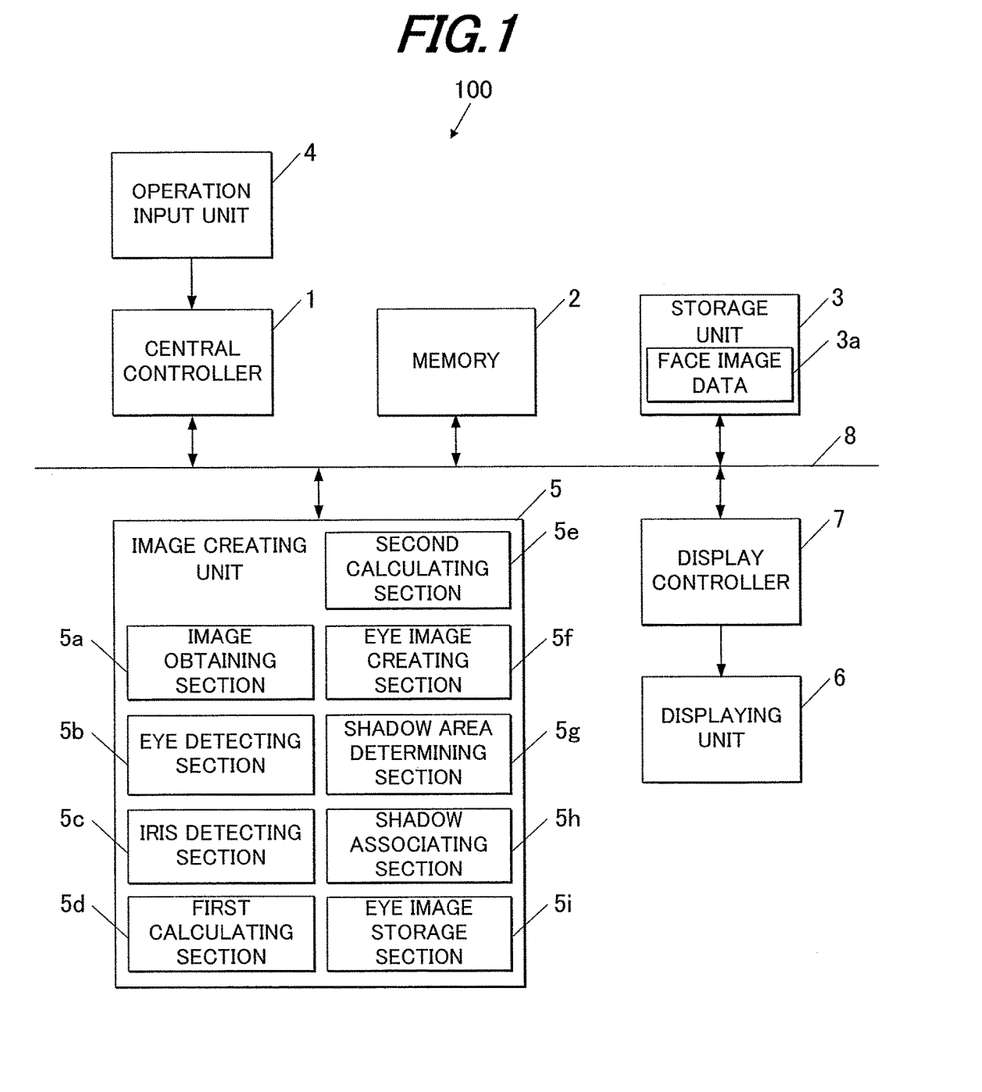
FIG. 1 is a block diagram showing the general configuration of an image processing device of an embodiment to which the present invention is applied.

FIG. 1 is a block diagram showing the general configuration of an image processing device 100 of an embodiment to which the present invention is applied.

The image processing device 100 is composed of, for example, a computer, such as a personal computer or a workstation. As shown in FIG. 1, the image processing device 100 includes a central controller 1, a memory 2, a storage unit 3, an operation input unit 4, an image creating unit 5, a displaying unit 6, and a display controller 7.

The central controller 1, the memory 2, the storage unit 3, the image creating unit 5, and the display controller 7 are connected to each other with a bus line 8.

The central controller 1 controls the components of the image processing device 100. Specifically, the central controller 1 includes a central processing unit (CPU) (not shown) and performs various controlling operations in accordance with various processing programs (not shown) for the image processing device 100.

The memory 2 is composed of, for example, a dynamic random access memory (DRAM). The memory 2 includes a buffer memory to temporarily store data to be processed by the central controller 1 and the image creating unit 5 etc., a working memory for the central controller 1 etc., and a program memory containing various programs and data associated with the functions of the image processing device 100. The memories are not shown.

The storage unit 3 is composed of, for example, a non-volatile memory (flash memory) or hard drive. The storage unit 3 stores various programs and data (not shown) necessary for the operations of the central controller 1.

The storage unit 3 stores pieces of face image data 3a.

Figure 3A:
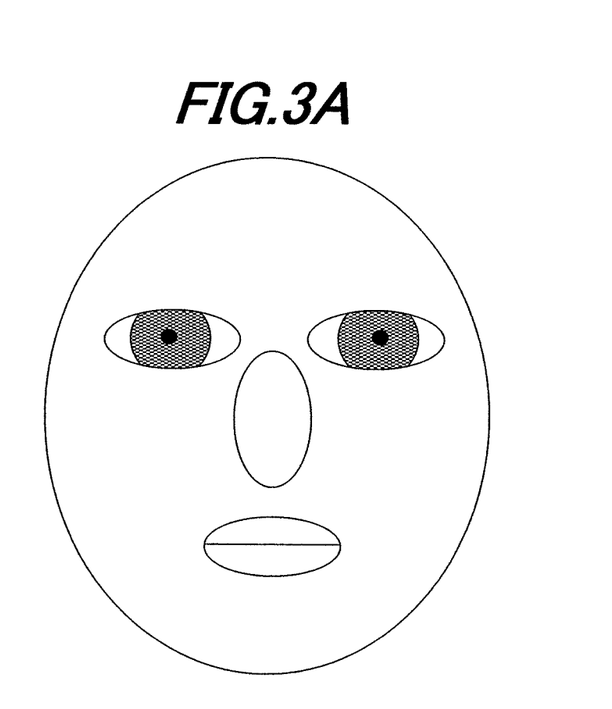
FIG. 3A is a schematic depiction of a face image related to the eye image creating process of FIG. 2.
Figure 3B:
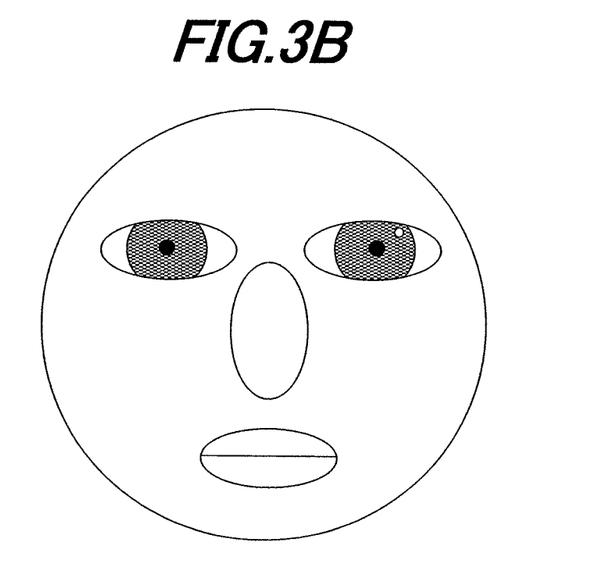
FIG. 3B is a schematic depiction of a face image related to the eye image creating process of FIG. 2.
Figure 3C:
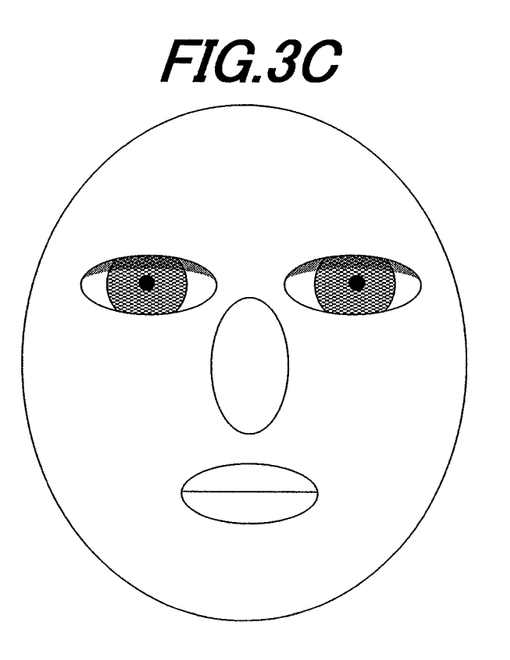
FIG. 3C is a schematic depiction of a face image related to the eye image creating process of FIG. 2.

The face image data 3a refers to data of two-dimensional face images including human faces (see FIGS. 3A to 3C). Each piece of face image data 3a may be any image data of an image including at least a face. For example, the face image data 3a may be image data of only a face and may be image data of an upper half of a body.

The face images of the face image data 3a shown in FIGS. 3A to 3O are illustrative only and not limitative. The face images may be changed as appropriate in any way.

The operation input unit 4 includes operation sections (not shown), such as a mouse and a keyboard having data input keys for inputting numerical values and characters, cursor keys for selecting data and scrolling, and various function keys. The operation input unit 4 outputs predetermined operation signals to the central controller 1 in accordance with the operations on the operation sections.

The image creating unit 5 includes an image obtaining section 5a, an eye detecting section 5b, an iris detecting section 5c, a first calculating section 5d, a second calculating section 5e, an eye image creating section 5f, a shadow area determining section 5g, a shadow associating section. 5h, and an eye image storage section 5i.

Each of the sections of the image creating unit 5 is composed of, for example, a predefined logic circuit. Such a configuration is, however, illustrative only and not limitative.

The image obtaining section 5a obtains face image data 3a.

Specifically, the image obtaining section 5a obtains face image data 3a of a two-dimensional image including a face to be processed through the eye image creating process. More specifically, the image obtaining section 5a obtains, as an object of the eye image creating process, user's desired face image data 3a specified by a predetermined operation on the operation input unit 4 by a user from among a predetermined number of pieces of face image data 3a stored in the storage unit 3, for example.

The image obtaining section 5a may obtain face image data 3a from an external device (not shown) connected via a communication controller (not shown).

The eye detecting section 5b detects eye areas in a face image.

Figure 4A:
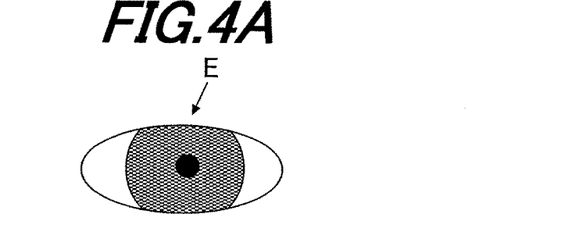
FIG. 4A is a schematic depiction of an image related to a first process in the eye image creating process of FIG. 2.

Specifically, the eye detecting section 5b detects eye areas E (see FIG. 4A) through a process using an Active Appearance Model (AAM) in a face image obtained by the image obtaining section 5a.

The AAM is a method for visual-event modeling and is a process for modeling of any face area image. For example, the eye detecting section 5b records, in a predetermined recording means, the results of statistical analysis of the locations and pixel values (e.g., luminance values) of predetermined feature regions (e.g., corners of eyes, nose tips, and face lines) in multiple sample face images. The eye detecting section 5b sets shape models representing the shapes of faces and texture models representing "appearances" of average shapes with reference to the locations of the feature regions. The eye detecting section 5b models a face image using these models. The parts of the face, such as the eyes, nose, mouth, eyebrows, and facial contour, are thus modeled in the face image.

The detection of eye areas E performed through the RAM is illustrative only and not limitative. Any other method, such as edge extraction, anisotropic diffusion, or template matching, may be used as appropriate instead.

The iris detecting section 5c detects the iris area Ea of each eye.

Specifically, the iris detecting section 5c detects the iris area Ea of each eye in a face image obtained by the image obtaining section 5a. More specifically, the iris detecting section 5c converts image data of each eye area E detected by the eye detecting section 5b in a face image into a predetermined color space (e.g., HSV color space, HLS color space, or RGB color space). The iris detecting section 5c determines the color corresponding to the white of the eye and determines the areas Eb1 and Eb2 of the white of the eye using a predetermined threshold value. The iris detecting section 5c then detects, using a predetermined detection method, the iris area Ea in the eye area E detected by the eye detecting section 5b.

Figure 4B:
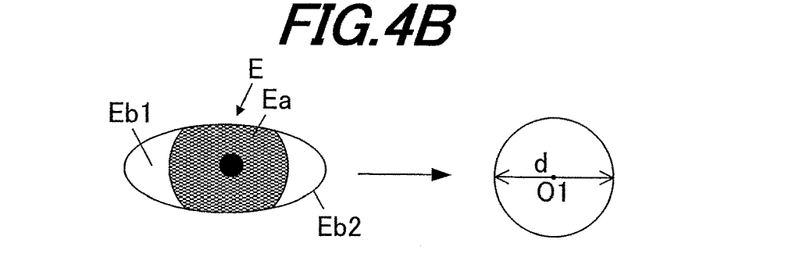
FIG. 4B is a schematic depiction of an image related to the first process in the eye image creating process of FIG.

For example, the iris detecting section 5c detects the iris area Ea in image data of each eye area E using an annular ring filter (see FIG. 4B). The ring filter determines, to be candidate points, points having luminance values that are a predetermined value or more away from the luminance value of the areas of the white of the eye (Eb1 and Eb2) in the image of the eye area E. An area with the edge shape closer to a perfect circle has a higher numerical value. The iris detecting section 5c extracts the area having the highest numerical value as an iris area Ea.

Figure 5A:
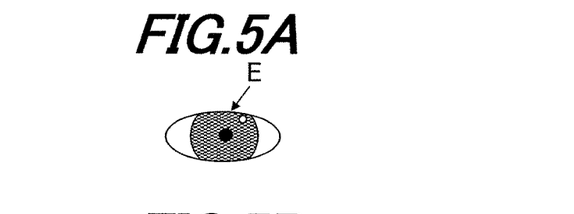
FIG. 5A is a schematic depiction of an image related to a second process in the eye image creating process of FIG. 2.
Figure 5B:
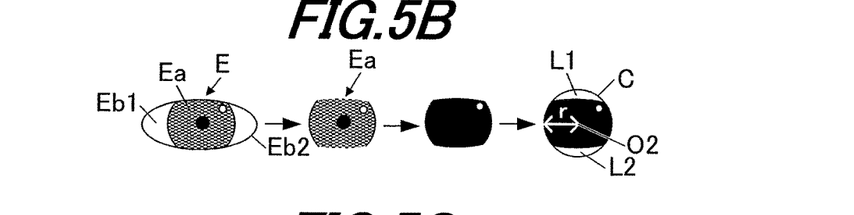
FIG. 5B is a schematic depiction of an image related to the second process in the eye image creating process of FIG. 2.
Figure 5C:
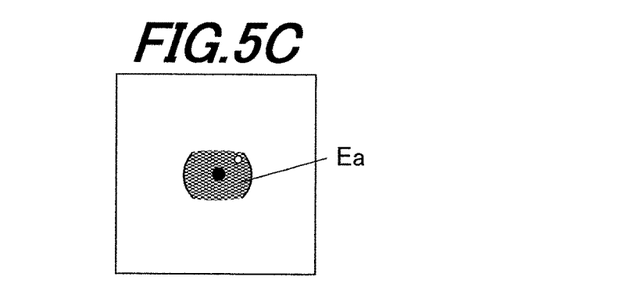
FIG. 5C is a schematic depiction of an image related to the second process in the eye image creating process of FIG. 2.
Figure 5D:
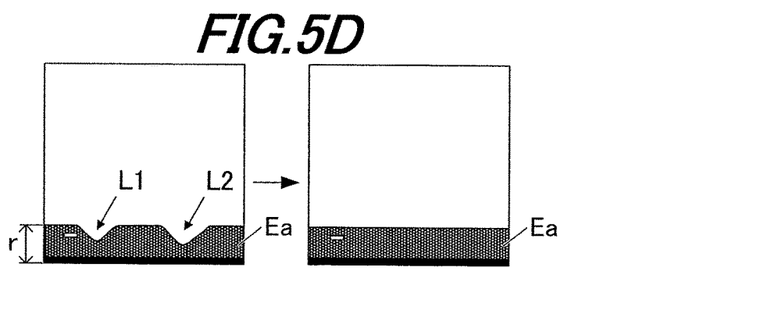
FIG. 5D is a schematic depiction of an image related to the second process in the eye image creating process of FIG. 2.
Figure 5E:
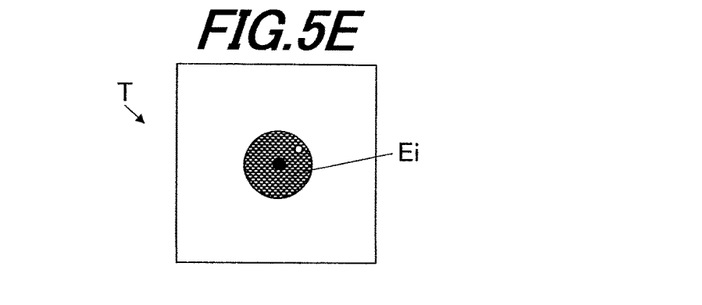
FIG. 5E is a schematic depiction of an image related to the second process in the eye image creating process of FIG. 2.

Alternatively, the iris detecting section 5c detects, as an iris area Ea, the inside of the smallest circle (smallest enclosing circle C) enclosing the area other than the white of the eye in each eye area E based on the color information of the image data of the eye area E (see FIG. 5E). The smallest enclosing circle C refers to a circle having the smallest radius r among the circles enclosing the area other than the white of the eye.

The methods for detecting each iris area Ea described above are illustrative only and not limitative and may be modified as appropriate in any way.

For example, in the case of use of an annular ring filter, the iris detecting section 5c may detect the iris area Ea in the image data of the eye area E using the annular ring filter, and after that determine the color and areas Eb1 and Eb2 of the white of the eye in the area other than the iris area Ea.

Figure 6A:
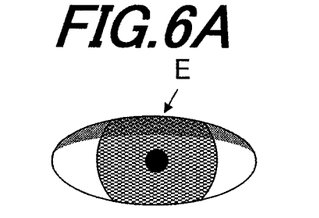
FIG. 6A is a schematic depiction of an image related to a process to add a shadow area in the eye image creating process of FIG. 2.
Figure 6B:
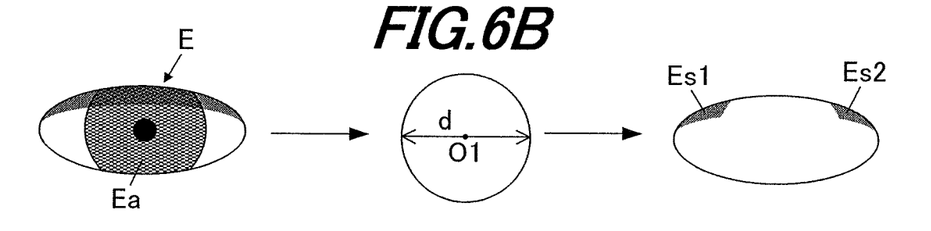
FIG. 6B is a schematic depiction of an image related to the process to add a shadow area in the eye image creating process of FIG. 2.

Alternatively, the iris detecting section 5c may detect the iris area Ea in the image data of the eye area E using the annular ring filter, and after that remove the iris area Ea from the eye area E to detect the area other than the iris area Ea (see FIG. 6B). In the eye area E of FIG. 6B, a shadow of the upper eyelid is produced by light, and thus shadow areas Es are included in the areas Eb1 and Eb2 of the white of the eye in the area other than the iris area Ea.

The first calculating section 5d calculates the center O1 and the diameter d of each iris area Ea.

Specifically, when the iris area Ea is detected by the iris detecting section 5c using an annular ring filter, the first calculating section 5d calculates the center O1 and the diameter d of the iris area Ea (see, for example, FIG. 4B). FIG. 4B schematically shows a circle having the calculated center O1 and the diameter d of the iris area Ea.

The second calculating section 5e calculates the center O2 and the radius r of the smallest circle enclosing each iris area Ea.

Specifically, when the iris area Ea is detected by the iris detecting section 5c based on the color information of the image data of the eye area E, the second calculating section 5e calculates the center O2 and the radius r of the smallest enclosing circle C enclosing the iris area Ea (see FIG. 5B).

The eye image creating section 5f fills in missing parts L1 and L2 of each iris area Ea.

Specifically, the eye image creating section 5f fills in missing parts L1 and L2 so that the iris area Ea detected by the iris detecting section 5c has a substantially circular shape. More specifically, the eye image creating section 5f fills in missing parts L1 and L2 of the iris area Ea detected by the iris detecting section 5c using a predetermined detection method.

Figure 4C:
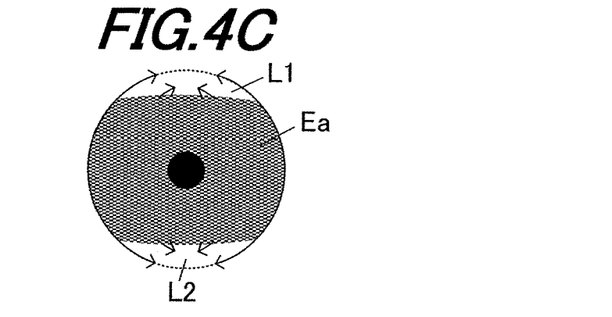
FIG. 4C is a schematic depiction of an image related to the first process in the eye image creating process of FIG. 2.

For example, the eye image creating section 5f fills in missing parts L1 and L2 so that the iris area Ea has a substantially circular shape based on the center O1 and the diameter d of the iris area Ea calculated by the first calculating section 5d. Specifically, the eye image creating section 5f concentrically superposes the iris area Ea on the circle having the calculated center O1 and the diameter d of the iris area Ea and fills in the pixels of the missing parts L1 and L2 with representative values of the pixel values on the concentric circles, to create an iris image Ei (see FIG. 4O).

Each of the representative values of the pixel values for filling in the missing parts L1 and L2 may be the pixel value of the pixel adjacent to a pixel of the missing parts L1 and L2 on a concentric circle, or may be the average value or median value of the pixel values of multiple pixels on the concentric circle.

Figure 4D:
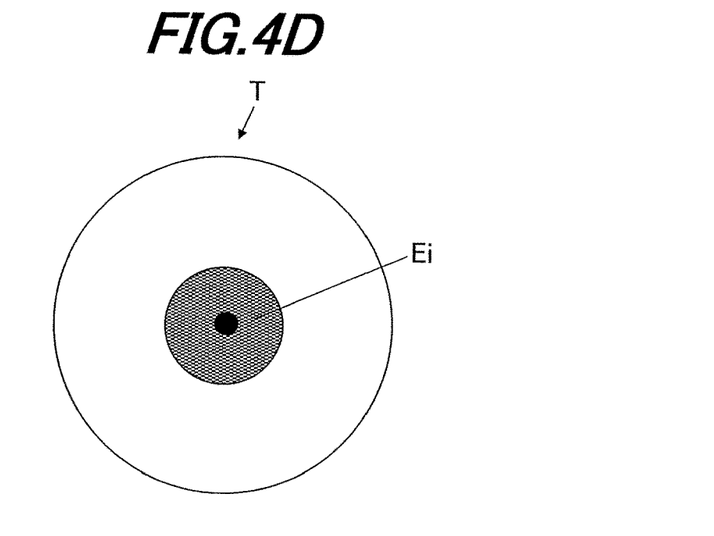
FIG. 4D is a schematic depiction of an image related to the first process in the eye image creating process of FIG. 2.

The eye image creating section 5f determines the size of the eyeball which is substantially circular in a planar view, the size being estimated from the diameter d of the substantially circular iris image Ei. The eye image creating section 5f disposes the iris image Ei at a predetermined position (e.g., substantially in the center) in the circle. The eye image creating section 5f then paints the area around the iris image Ei with the color corresponding to the white of the eye, thereby creating an eye texture image T (see FIG. 4D).

Alternatively, for example, the eye image creating section 5f fills in missing parts L1 and L2 within the radius r from the center O2 of the smallest enclosing circle C corresponding to the iris area Ea calculated by the second calculating section 5e, so that the iris area Ea has a substantially circular shape. Specifically, the eye image creating section 5f determines the size of the three-dimensional sphere of the eyeball estimated from the diameter d of the smallest enclosing circle C calculated by the second calculating section 5e, and creates two-dimensional substantially-square image data corresponding to the sphere (see FIG. 5C).

The eye image creating section 5f then disposes the iris area Ea detected by the iris detecting section 5c at a predetermined position (e.g., substantially in the center) in the substantially square image data. The eye image creating section 5f then makes a transformation from predetermined coordinates (e.g., Cartesian coordinates) to polar coordinates to rearrange the pixels of the iris area Ea. The eye image creating section 5f then fills in missing parts L1 and L2 within the radius r from the center O2 in the radiation direction with the representative values (e.g., average values or median values) of the pixel values in the direction perpendicular to the radius direction (see FIG. 5D), to create an eye texture image T including the iris image Ei (see FIG. 5E).

The eye image creating section 5f may fill in the missing parts L1 and L2 with the representative values (e.g., average values or median values) of the pixel values in the direction perpendicular to the radius direction within a range of the value of half of the diameter d (i.e., radius) from the center O1 of the iris area Ea in the radiation direction, based on the center O1 and the diameter d of the iris area Ea calculated by the first calculating section 5d. The eye image creating section 5f may fill in the pixels of the missing parts L1 and L2 with the pixel values on the concentric circles, based on the center O2 and the radius r of the smallest enclosing circle C calculated by the second calculating section 5e.

The shadow area determining section 5g determines a shadow area in each eye area E.

Figure 6C:
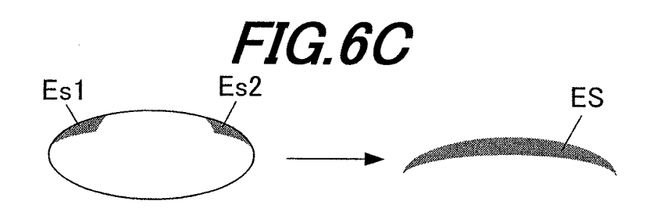
FIG. 6C is a schematic depiction of an image related to the process to add a shadow area in the eye image creating process of FIG. 2.

Specifically, the shadow area determining section 5g determines shadow areas Es1 and Es2 produced by light in the eye area E detected by the eye detecting section 5b. More specifically, the shadow area determining section 5g converts the image data of the area other than the iris area Ea (the areas Eb1 and Eb2 of the white of the eye including the shadow areas Es1 and Es2) detected by the iris detecting section 5c into a predetermined color space (e.g., HSV color space). The shadow area determining section 5g determines the color corresponding to the white of the eye and determines the areas Eb1 and Eb2 of the white of the eye using a predetermined threshold value. The shadow area determining section 5g then determines, to be the color corresponding to a shadow, the color of the area other than the areas Eb1 and Eb2 of the white of the eye in the area other than the iris area Ea, and determines the area having the color to be a shadow area. In the case of FIG. 6C, for example, the central part of the shadow area is split off due to the removal of the iris area Ea. The shadow area determining section 5g determines the width, in the vertical direction, of the end parts of the shadow areas adjacent to the iris area Ea and performs drawing along the upper edge part of the eye in such a way that a shadow area having the width is present above the iris area Ea. The shadow area determining section 5g thereby connects the two shadow areas Es1 and Es2 to determine the shadow area ES corresponding to substantially the entire upper eyelid.

The shadow associating section 5h associates the position data of the shadow area Es with the position data of the eye.

Specifically, the shadow associating section 5h creates the position data of the shadow areas Es1 and Es2 determined by the shadow area determining section 5g and associates the created position data with the position data of the eye area E. More specifically, the shadow associating section 5h sets multiple control points p on the upper edge parts and the lower edge parts of the shadow areas Es1 and Es2 determined by the shadow area determining section 5g, and makes a mesh division into a predetermined-shape (e.g., triangular) mesh (see FIG. 6D). The shadow associating section 5h then associates the eye texture image T created by the eye image creating section 5f with the position data of the control positions p, with the position data of the upper edge part of the eye area E (the lower end part of the upper eyelid), and with the color data of the shadow area ES.

The eye image storage section 5i stores the eye texture image T.

Specifically, the eye image storage section 5i stores the image data of the iris area Ea with the missing parts L1 and L2 filled in by the eye image creating section 5f. More specifically, the eye image storage section 5i stores the image data of the eye texture image T (with or without the information on shadow area) created by the eye image creating section 5f and stores the three-dimensional eyeball sphere model to which the eye texture image T is to be applied, with the image data of the eye texture image T and the eyeball sphere model being associated with each other.

The displaying unit 6 is composed of a display, such as a liquid crystal display (LCD) or a cathode ray tube (CRT), to display various pieces of information on a display screen under the control of the display controller 7.

The display controller 7 performs control to create display data and to display the data on the display screen of the displaying unit 6.

Specifically, the display controller 7 includes a video card (not shown) provided with, for example, a graphics processing unit (GPU) and a video random access memory (VRAM).

The display controller 7 creates, through a drawing process with the video card, display data of various screens for creation of an eye image by the eye image creating process, in accordance with the display instructions from the central controller 1. The display controller 7 outputs the created display data to the displaying unit 6.

<Eye Image Creating Process>

The eye image creating process to be performed by the image processing device 100 will now be described with reference to FIGS. 2 to 7G.

Figure 2:
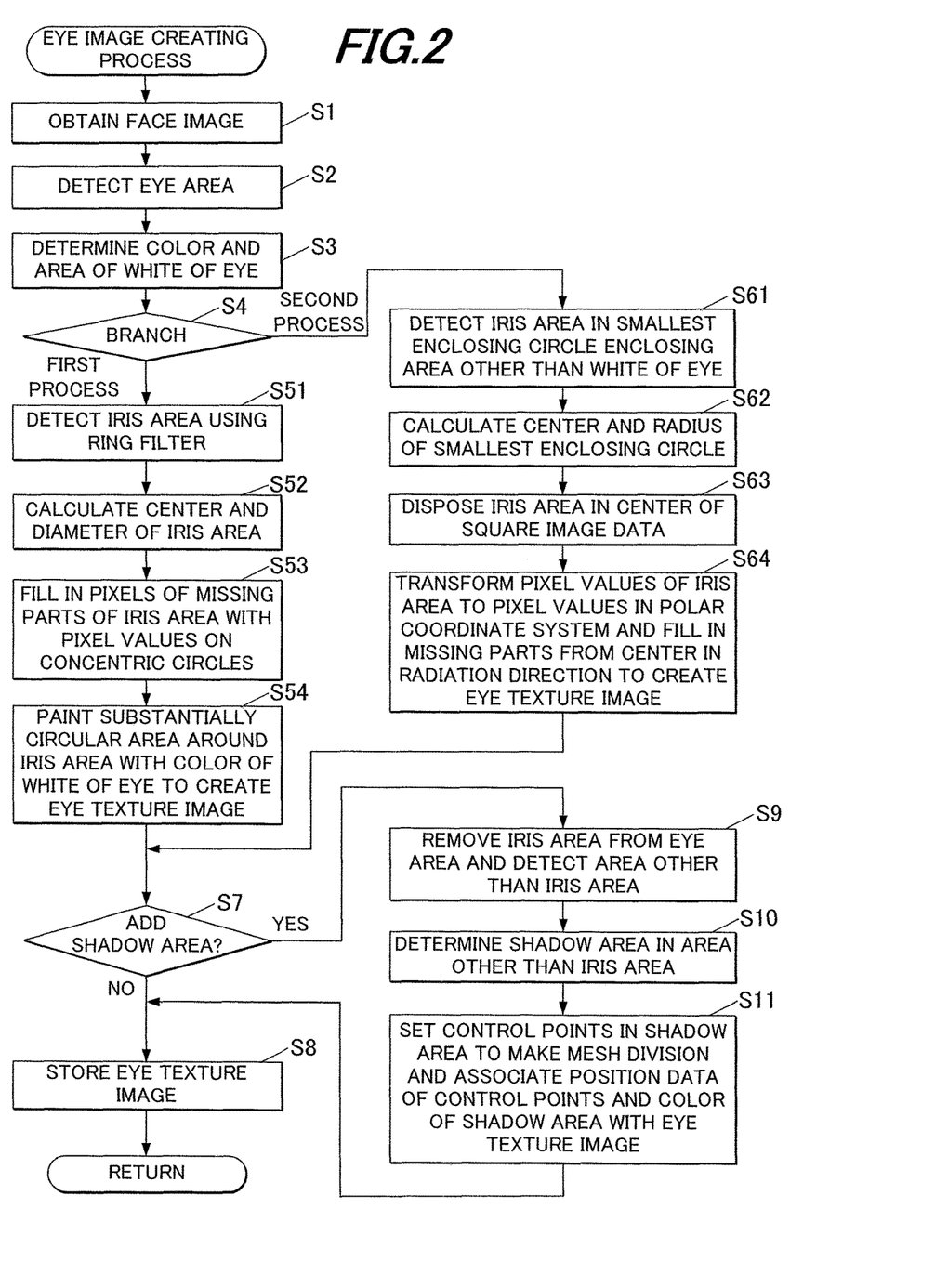
FIG. 2 is a flowchart showing an example operation involved in an eye image creating process to be performed by the image processing device of FIG. 1.

FIG. 2 is a flowchart showing an example operation involved in the eye image creating process.

As shown in FIG. 2, the image obtaining section 5a of the image creating unit 5 obtains user's desired piece of face image data 3a specified by a predetermined operation on the operation input unit 4 by a user from among a predetermined number of pieces of face image data 3a stored in the storage unit 3 (Step S1, see FIGS. 3A to 3C).

The eye detecting section 5b then detects, through a process using the AAM, an eye area E in the face image obtained by the image obtaining section 5a (Step S2). The iris detecting section 5c then converts the image data of the eye area E detected in the face image into a predetermined color space (e.g., HSV color space) to determine the color corresponding to the white of the eye and to determine the areas Eb1 and Eb2 of the white of the eye using a predetermined threshold value (Step S3).

The image creating unit 5 then makes the process branch depending on a method for detecting an iris area Ea (Step S4). Specifically, the image creating unit 5 advances the process to Step 51 for the case of a first process in which an iris area Ea is detected with a ring filter (Step S4: first process); whereas the image creating unit 5 advances the process to Step 61 for the case of a second process in which the inside of the smallest enclosing circle C is detected as an iris area Ea (Step S4: second process).

<First Process>

In the first process (Step S4: first process), the iris detecting section 5c detects an iris area Ea in the image data of the eye area E using an annular ring filter (Step S51, see FIG. 4B).

The first calculating section 5d then calculates the center O1 and the diameter d of the iris area Ea detected by the iris detecting section 5c (Step S52).

The eye image creating section 5f then concentrically superposes the iris area Ea on the circle having the calculated center O1 and the diameter d of the iris area Ea. The eye image creating section 5f fills in the pixels of missing parts L1 and L2 with the representative values of the pixel values on the concentric circles to create an iris image Ei (Step S53, see FIG. 4C). The eye image creating section 5f then determines the size of the eyeball, which is substantially circular in a planar view, the size being estimated from the diameter d of the substantially circular iris image Ei. The eye image creating section 5f disposes the iris image Ei at a predetermined position (e.g., substantially in the center) of the circle and paints the area around the iris image Ei with the color corresponding to the white of the eye, to create an eye texture image T (Step S54, see FIG. 4D).

<Second Process>

In the second process (Step S4 second process), the iris detecting section 5c detects, as an iris area Ea, the inside of the smallest enclosing circle C enclosing the area other than the white of the eye in the eye area E based on the color information of the image data of the eye area E (Step S61, see FIG. 5B).

The second calculating section 5e then calculates the center O2 and the radius r of the smallest enclosing circle C enclosing the iris area Ea detected by the iris detecting section 5c (Step S62).

The eye image creating section 5f then determines the size of the three-dimensional sphere of the eyeball estimated from the calculated diameter d of the smallest enclosing circle C, creates two-dimensional substantially-square image data corresponding to the sphere, and disposes the iris area Ea substantially in the center of the substantially square image data (Step S63, see FIG. 5C). The eye image creating section 5f then transforms the coordinates of the positions of the pixels of the iris area Ea from Cartesian coordinates to polar coordinates for rearrangement. The eye image creating section 5f then fills in missing parts L1 and L2 in the radiation direction from the center O2 with the representative values of the pixel values in the direction perpendicular to the radius direction (see FIG. 5D). The eye image creating section 5f thus create an eye texture image T including the iris image Ei (Step S64).

After that the image creating unit 5 determines whether to add a shadow area to the eye texture image T (Step S7). For example, the image creating unit 5 determines whether to add a shadow area depending on whether an instruction of addition of a shadow area is input by a user's predetermined operation on the operation input unit 4.

If it is determined that a shadow area is not to be added (Step S7: NO) the eye image storage section 5i stores the image data of the eye texture image T created by the eye image creating section 5f and stores the three-dimensional eyeball sphere model to which the eye texture image T is to be applied, with the image data of the eye texture image T and the eyeball sphere model being associated with each other (Step S8).

This brings the eye image creating process to an end.

If, on the other hand, it is determined in Step S7 that a shadow area is to be added (Step S7: YES), the iris detecting section 5c obtains a copy of the image data of the eye area E detected in the face image by the eye detecting section 5b; removes, from the obtained eye area E, the iris area Ea detected with a ring filter; and then detects the area other than the iris area Ea (Step 9).

The shadow area determining section 5g then determines a shadow area produced by light in the area other than the iris area Ea detected by the iris detecting section 5c (Step S10). Specifically, the shadow area determining section 5g converts the image data of the area other than the iris area Ea into a predetermined color space (e.g., HSV color space). The shadow area determining section 5g determines the color corresponding to the white of the eye and determines the areas Eb1 and Eb2 of the white of the eye using a predetermined threshold value. After that the shadow area determining section 5g determines, to be the color corresponding to a shadow, the color of the area other than the areas Eb1 and Eb2 of the white of the eye in the area other than the iris area Ea, and determines the area having the color to be shadow areas Ee1 and Es2.

If the central part of the shadow area Es is split off (see FIG. 6C), the shadow area determining section 5g connects the two shadow areas Es1 and Es2 by drawing along the upper edge part of the eye in such a way that a shadow area Es is present above the iris area Ea, thereby determining a shadow area ES corresponding to substantially the entire width of the upper eyelid.

Figure 6D:
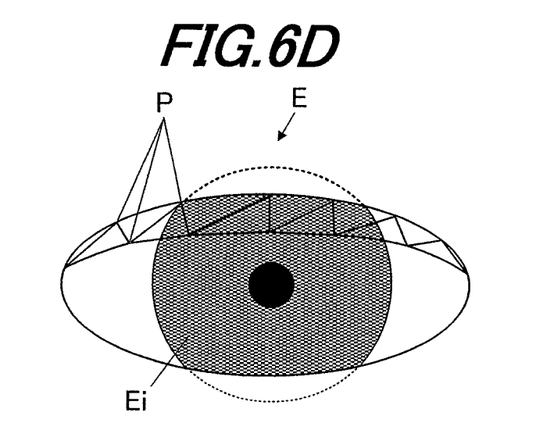
FIG. 6D is a schematic depiction of an image related to the process to add a shadow area in the eye image creating process of FIG. 2.

The shadow associating section 5h then sets multiple control points p on the upper edge part and the lower edge part of the determined shadow area ES to make a mesh division into a predetermined-shape (e.g., triangular) mesh (see FIG. 6D). After that, the shadow associating section 5h associates the eye texture image T with the position data of the control points p, with the position data of the upper edge part of the eye area E (the lower end part of the upper eyelid), and with the color data of the shadow area ES (Step S11).

The image creating unit 5 then advances the process to Step S8, where the eye image storage section 5i stores the image data of the eye texture image T (which is associated with the position data of the control points p of the shadow area ES, with the position data of the upper edge part of the eye area E, and with the color data of the shadow area ES by the shadow associating section 5h) and stores the three-dimensional eyeball sphere model (to which the eye texture image T is to be applied) with the image data of the eye texture image T and the eyeball sphere model being associated with each other (Step S8).

This brings the eye image creating process to an end.

Figure 7A:
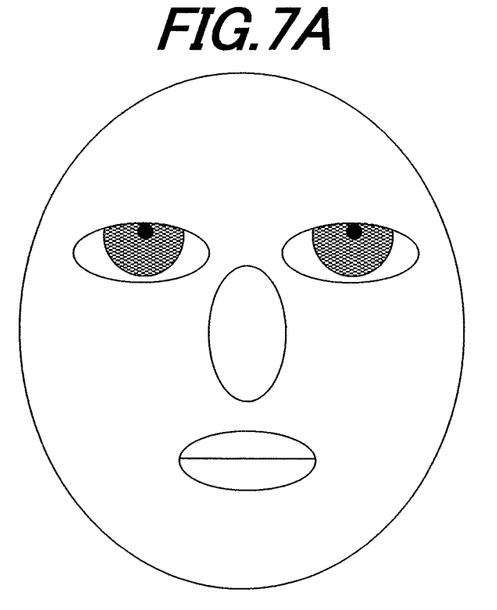
FIG. 7A is a schematic depiction of a face image related to the eye image creating process of FIG. 2.
Figure 7B:
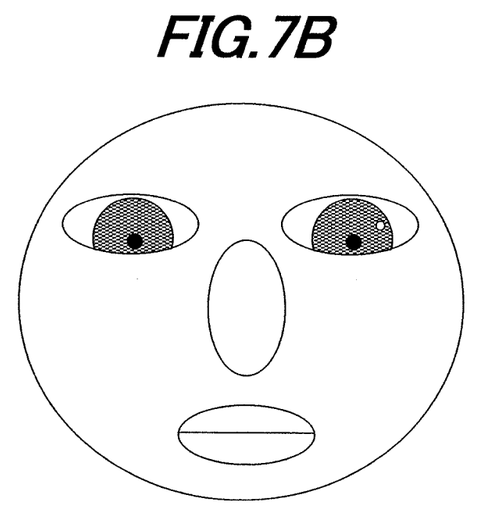
FIG. 7B is a schematic depiction of a face image related to the eye image creating process of FIG. 2.

The image data of the eye texture images T created by the eye image creating process is placed at the apertures of the eyes of a face image at the back of the face image. This makes it easy to create a face image having the eyeballs moving around and having a moving line of sight, as shown in FIGS. 7A and 7B, without providing a feeling of strangeness.

Figure 7C:
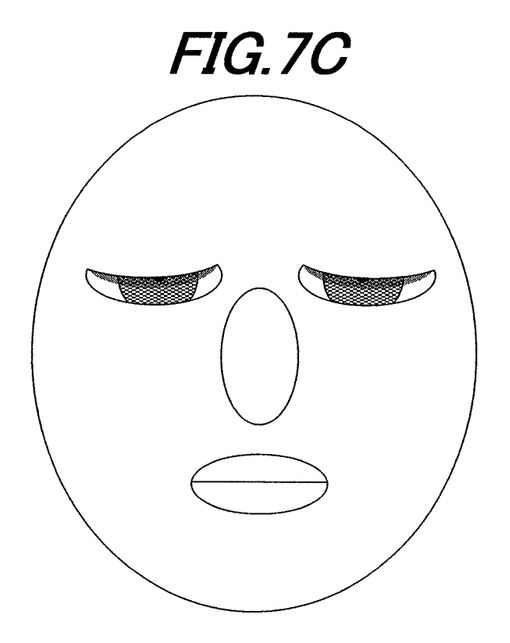
FIG. 7C is a schematic depiction of a face image related to the eye image creating process of FIG. 2.

For example, as shown in FIG. 7C, the control points p of the shadow areas ES are moved along with the opening and closing of the eyelids and the shadow areas ES are moved accordingly, with the use of the image data of the eye texture images T each of which is associated with the position data of the control points p of the shadow area Es, with the position data of the upper edge part of the eye area E (the lower end part of the upper eyelid), and with the color data of the shadow area ES. This enables proper and easy representation of shadows produced by light without providing a feeling of strangeness. When the shadow areas ES, which are superposed on the eye areas E, are made transparent to a predetermined degree on the display, the representation of the shadows can be made more natural.

As described above, the image processing device 100 of this embodiment detects the iris areas Ea of the eye areas E in a face image and fills in missing parts L1 and L2 of the iris areas Ea so that the detected iris areas Ea each have a substantially circular shape. The representation of face having the eyeballs moving around and having a moving line of sight can be made natural with the use of the substantially circular iris images Ei with their missing parts L1 and L2 filled in and, in particular, with the use of the eye texture images T including the iris images Ei. Further, the eye texture images T including the iris images Ei can be easily created from a single two-dimensional face image.

Further, since the image data of the eye texture images T including the iris images Ei with their missing parts L1 and L2 filled in is stored, the eyeballs can be moved independently of the other parts of the face, such as the mouth and nose, with the use of the image data of the eye texture images T. This makes it easy to perform the process to move the eyes in a face image.

Further, since the missing parts L1 and L2 are filled in so that each iris area Ea has a substantially circular shape based on the center O1 and the diameter d of the iris area Ea, the missing parts L1 and L2 of the iris area Ea can be properly and easily filled in. This enables proper creation of the substantially circular iris image Ei. In particular, the use of the representative values of the pixel values of the iris area Ea to fill in the missing parts L1 and L2 achieves more proper filling-in of the missing parts L1 and L2.

Further, the center O2 and the radius r of the smallest enclosing circle C enclosing each iris area Ea are calculated, and the missing parts L1 and L2 are filled in so that the iris area Ea has a substantially circular shape within the radius r from the center O2 in the radiation direction. This can properly fill in the missing parts L1 and L2 of the iris area. Ea, enabling proper creation of the substantially circular iris image Ei. In particular, a transformation is made from Cartesian coordinates to polar coordinates to rearrange the pixels of the iris area Ea, and the missing parts L1 and L2 are filled in with the representative values of the pixel values in the direction perpendicular to the radius direction. Such a configuration not only prevents the pixels at the same distance from the center O2 from being influenced by the features of pixels at other distances from the center O2, but also can maintain the nature of the iris area Ea, such as the light reflection, the pattern of the iris, and the pupil. This enables creation of an iris image Ei having a natural texture.

Further, shadow areas produced by light are determined in the eye areas E of a face image and the position data of the determined shadow areas is created. This enables the shadow areas to move along with the opening and closing of the eyelids by using the position data of the shadow areas. Proper and easy representation of shadows produced by light can thus be achieved without providing a feeling of strangeness.

Shown below are variations of methods to fill in missing parts L1 and L2 for iris areas Ea to have a substantially circular shape.

(Variation 1)

Figure 8:
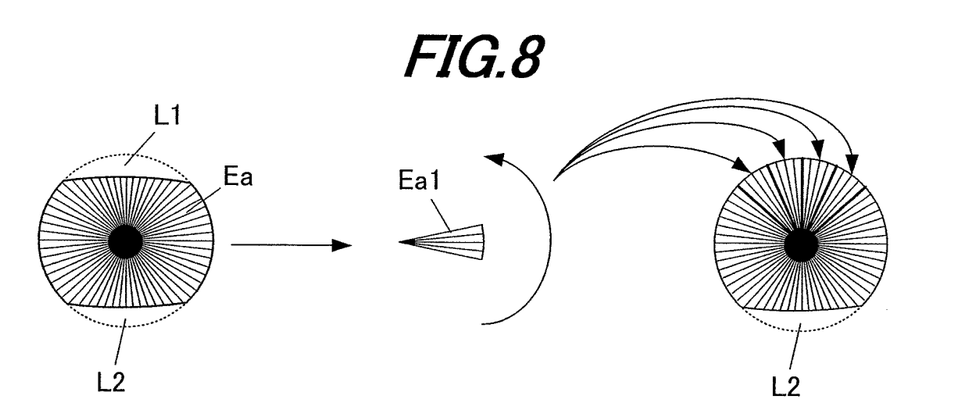
FIG. 8 shows Variation 1 of the eye image creating process of FIG. 2.

A dilator of pupil, which is a type of iris muscle, appears radially an iris outside of the pupil. Variation 1 represents the dilator of pupil more exactly. For example, as shown in FIG. 8, a 15-degree fan-shaped area Ea1 extending from the center to the circumference without a missing part is cut out. The center and the radius of the iris area Ea are determined as described above, and it is determined whether there is a missing part from the center in a circumferential direction. If it is determined that there is a missing part, the missing part is filled in with the fan-shaped area Ea1.

(Variation 2)

Figure 9:
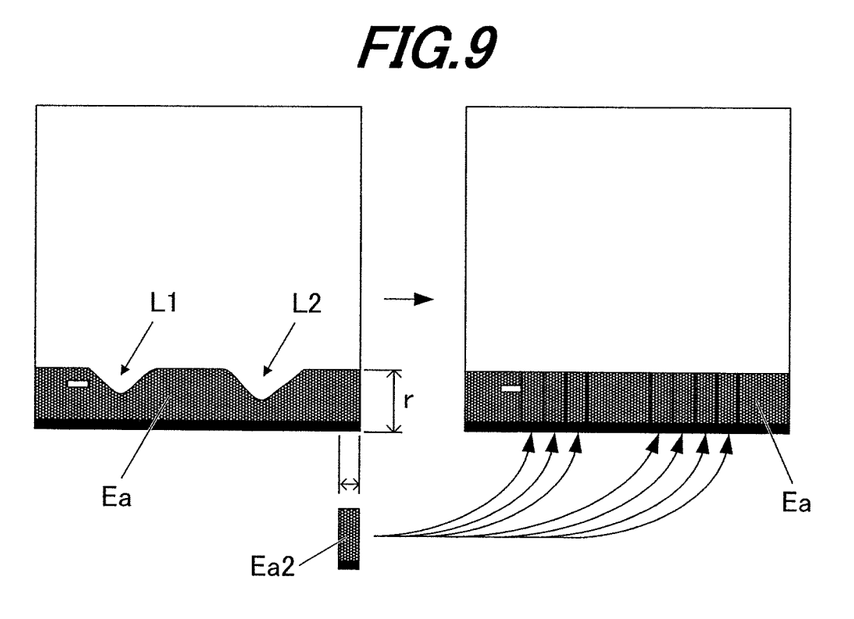
FIG. 9 shows Variation 2 of the eye image creating process of FIG. 2.

FIG. 9 shows a variation with a polar coordinate transformation. The coordinates of the position of the pixels of an iris area Ea are transformed from Cartesian coordinates to polar coordinates with the iris being the center. An area having the maximum value is identified in the transformed iris area, and the identified area is taken out as a strip area Ea2 having a predetermined size. After that, an area, having a value equal to or less than the maximum value, of the iris area is filled in with the strip area Ea2. Thus a missing part at the circumference can be filled in.

The present invention is not limited to the embodiments described above. Various improvements and modifications in design may be made without departing from the gist of the present invention.

For example, the image processing device 100 of the embodiments described above can implement both the method using a ring filter and the method using color information of image data of an eye area E. This is, however, illustrative only and not limitative. For example, only one of these methods may be implemented.

Further, in the above-described embodiments, the methods are implemented by the driving of the image obtaining section 5a, the iris detecting section 5c, and the eye image creating section 5f under the control of the central controller 1 of the image processing device 100. This is, however, not limitative. The methods may be implemented by the CPU of the central controller 1 executing a predetermined program.

Specifically, a program including an obtaining process routine, a detecting process routine, and a filling-in process routine is stored in a program memory. The obtaining process routine may cause the CPU of the central controller 1 to function as a means to obtain an image including an eye. The detecting process routine may cause the CPU of the central controller 1 to function as a means to detect the iris area Ea of the eye in the obtained image. The filling-in process routine may cause the CPU of the central controller 1 to function as a means to fill in missing parts L1 and L2 of the detected iris area Ea so that the iris area Ea has a substantially circular shape.

The above-described processes may be performed by a single controller or may be performed by two or more controllers.

A non-volatile memory, such as a flash memory, and a portable storage medium, such as a CD-ROM, as well as a ROM and a hard disk may be used as a computer-readable medium having stored thereon the program to execute the above-described processes. A carrier wave may also be used as a medium to provide program data through a predetermined communication line.

The scope of the present invention is not limited to the embodiments described above but includes the scope of the claims and the scope of the equivalents thereof.

INDUSTRIAL APPLICABILITY

As described above, the present invention is particularly suitable for use in a technique that can naturally express a face with the eyeballs moving around and with the line of sight moving.

REFERENCE NUMERALS 100 image processing device
1 central controller
3 storage unit
3a face image data
5a image obtaining section
5c iris detecting section
5d first calculating section
5e second calculating section
5f eye image creating section
5g shadow area determining section
5h shadow associating section
5i eye image storage section

The invention claimed is:

1. An image display device comprising:
a hardware processor which is configured to:
acquire a single image including a part of an iris of an eye;
detect an iris area of the iris of the eye in the single acquired image;
determine a missing part of the iris of the eye, based on the single acquired image, wherein the missing part of the iris of the eye is not present in the single acquired image;
calculate a representative value of a pixel value of the detected iris area, which does not include the missing part of the iris of the eye, in the single acquired image; and
fill in the missing part of the iris of the eye with the calculated representative value of the pixel value of the detected iris area; and
a display which displays the filled-in iris area.

2. The image display device according to claim 1, wherein the processor is configured to:
calculate a center and a diameter of the detected iris area, and
fill in the missing part so that the iris area has a substantially circular shape, based on the calculated center and diameter of the iris area.

3. The image display device according to claim 2, wherein the processor is configured to:
detect a location of the missing part in the iris area; and
calculate the representative value of the pixel value of the iris area corresponding to the detected location.

4. The image display device according to claim 1, wherein the processor is configured to:
calculate a center and a radius of a smallest circle enclosing the detected iris area, and
fill in the missing part so that the iris area has a substantially circular shape within the radius from the calculated center of the circle corresponding to the iris area.

5. The image display device according to claim 1, wherein the processor is configured to:
transform coordinates of a position of a pixel of the detected iris area from predetermined coordinates to polar coordinates, and
fill in the missing part with the representative value of the pixel value in a radius direction in the polar coordinates.

6. The image display device according to claim 1, wherein the processor is configured to:
determine a shadow area produced by light in the eye in the acquired image, and
create position data of the determined shadow area.

7. The image display device according to claim 1, further comprising a memory which stores image data of the iris area with the missing part filled in by the processor.

8. The image display device according to claim 1, wherein the processor is configured to:
extract a fan-shaped area from a part of the iris area other than the missing part, and
fill in the missing part with the fan-shaped area.

9. The image display device according to claim 1, wherein the processor is configured to:
transform coordinates of a position of a pixel of the detected iris area from predetermined coordinates to polar coordinates,
extract a strip area having a maximum value after the transformation, and
fill in the missing part with the strip area.

10. The image display device according to claim 1, wherein the processor comprises a plurality of processors.

11. The image display device according to claim 1, further comprising a memory,
wherein the processor is configured to store an image which includes the filled in iris area in the memory.

12. An image processing method using an image processing device which comprises a hardware processor, the method comprising:
- obtaining, with the processor, a single image including a part of an iris of an eye;
- detecting, with the processor, an iris area of the iris of the eye in the single obtained image;
- determining, with the processor, a missing part of the iris of the eye, based on the single obtained image, wherein the missing part of the iris of the eye is not present in the single obtained image,
- calculating, with the processor, a representative value of a pixel value of the detected iris area, which does not include the missing part of the iris of the eye, in the single obtained image;
- filling in, with the processor, the missing part of the iris of the eye with the calculated representative value of the pixel value of the detected iris area; and
- controlling, with the processor, a display to display the filled-in iris area.

13. A non-transitory computer-readable medium having a program stored thereon that is executable by a computer to cause the computer to perform:
- an obtaining process to obtain a single image including a part of an iris of an eye;
- a detecting process to detect an iris area of the iris of the eye in the single obtained image;
- a determining process to determine a missing part of the iris of the eye, based on the single obtained image, wherein the missing part of the iris of the eye is not present in the single obtained image;
- a calculating process to calculate a representative value of a pixel value of the detected iris area, which does not include the missing part of the iris of the eye, in the single obtained image;
- a filling-in process to fill in the missing part of the iris of the eye with the calculated representative value of the pixel value of the detected iris area; and
- a display process of controlling a display to display the filled-in iris area.

\* \* \* \* \*